(12) United States Patent
Nurre

(10) Patent No.: US 6,284,331 B1
(45) Date of Patent: Sep. 4, 2001

(54) HONEYCOMB CONTROL METHODS FOR EXPANSION AND COMPRESSION

(76) Inventor: Thomas C. Nurre, 1800 Riverwood La., Wisconsin Rapids, WI (US) 54494

( * ) Notice: Subject to any disclaimer, the term of this patent is extended or adjusted under 35 U.S.C. 154(b) by 0 days.

(21) Appl. No.: 09/405,886

(22) Filed: Sep. 24, 1999

(51) Int. Cl.7 .................................................... B32B 3/12
(52) U.S. Cl. ........................... 428/12; 428/116; 410/154; 493/966; 493/957
(58) Field of Search ..................... 428/116, 12; 410/154; 493/966, 957

(56) References Cited

U.S. PATENT DOCUMENTS 3,982,100 * 9/1976 Hervert ............................. 428/116 X
4,300,864 * 11/1981 Liebel et al. .

* cited by examiner

Primary Examiner—Deborah Jones
Assistant Examiner—Wendy Boss

(57) ABSTRACT

Honeycomb forms can be held in an expanded or compressed state by the use of a lengthwise device such as a cord or similar lengthwise material threaded through holes in the honeycomb plies. This cord has a frictional surface to hold the honeycomb from unintended movement.

Figure 1:
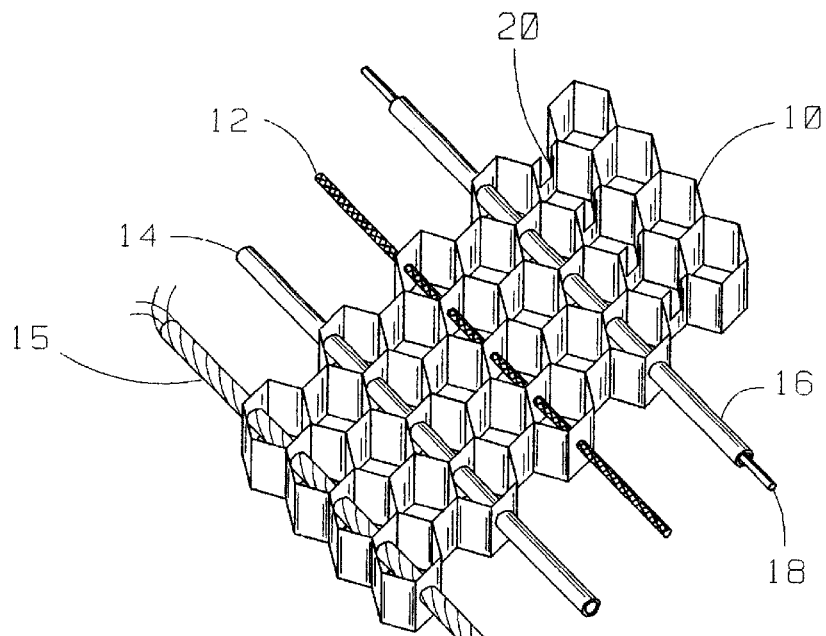

Additionally, a semi rigid lengthwise device, such as a twisted, stranded wire may be used with the separated strands preventing the return of the end plies.

10 Claims, 7 Drawing Sheets

HONEYCOMB CONTROL METHODS FOR EXPANSION AND COMPRESSION

This invention relates in general to honeycomb materials, specifically to a system for controlling structural honeycomb in an expanded, partially expanded or compressed state.

Structural honeycomb forms are frequently made by adhering sheets or strips of material to one another in an alternating pattern of adhesive stripes to form a flat pad. This pad is then usually cut into smaller sections known as slices. These slices are then expanded in the direction perpendicular to their faces by stretching and thus bending the individual sheets or strips at the joining adhesive stripes. Such stretching and bending results in a natural spring-back force which must be overcome to provide a stable, usefully expanded product. This has been accomplished in any of several ways, such as attaching facing sheets to one or both sides; by coating or impregnating to stiffen the expanded material; by softening fibrous material with moisture and holding it in its expanded state while drying. These expanding methods have produced very useful products, largely as cores for very lightweight and rigid assemblies with adhered skins. Many of these assemblies are found in aircraft manufacture, lightweight panels and doors in trucks and trailers, protective packaging and pallets, high speed railway cars, structural partitions and doors and many other applications.

The disadvantages to these methods are rather evident. They do require expensive machinery for the expansion and skin application. The processes require considerable space and the finished, expanded product itself requires much room for storage as well as shipping. By thus rigidifying the honeycomb form, it is no longer flexible or adjustable. In addition these bulky products are not easily recyclable because of their high crush resistance and therefore use much space in landfill disposal.

One known un-faced structural honeycomb use is as a void filler, used in loading rail box cars and trucks. In this method, an un-faced structural honeycomb form is hung from the top of a load and is expanded by gravity. This latter application has the drawback of being used only in a vertical position. In addition, its space filling ability is limited to just the thickness of the honeycomb form itself and thus requiring separate inventories to fill different size voids in the load.

The prior art for structural honeycomb describes many variations and uses. But the prior art does not contain methods that provide the flexibility or adjustability such as this invention describes.

It is the primary object of my invention to provide a structural honeycomb form that can be both flexible and adjustable and which incorporates one or more internal compressible cords, ropes, tubes, coated or covered wires, twisted wire brushes, plastic splines or similar longitudinal devices by means of which said form can be maintained in a state of expansion or compression. With frictional methods the form can be expanded to full length for greatest economy or expanded to various degrees at any place along its length and its length can be changed at any time including a complete compression back to its unexpanded condition for storage and future reuse. It can be expanded and compressed several times without losing this benefit of adjustability.

It is a further object of my invention to provide a structural honeycomb form that can be readily recycled by complete compression and easy removal of the longitudinal device.

It is a still further object of my invention to provide a structural honeycomb form that can be reused by complete compression for compact storage for later use.

It is a still further object of my invention to provide a structural honeycomb form whereby the said longitudinal device is in the form of tubing that can become a conduit or conduits for insertion of utilities of electric wire or communication devices or used to transmit gases or liquids.

It is a still further object of my invention to provide a structural honeycomb form whereby the said compressed honeycomb slices can be used in combination with flat or foldable forms to provide intermittent clearance or cushioning devices along its expanded length.

It is a still further object of my invention to provide a structural honeycomb form whereby compressed honeycomb slices can be adhered to adjacent compressed honeycomb slices to increase the expanded length possible.

To further explain the static friction resulting from the expansion of the honeycomb forms, the individual strips of a normally fully expanded form are bent at their juncture at an angle of approximately forty five degrees and together with the small adhesive nodes thus form the characteristic six-sided honeycomb cell. A hole is formed in the individual strips to accommodate a longitudinal device. This hole is preferably located in a diagonal leg of the cell and sized for a snug fit to establish static friction. The projected width of this hole after expansion is reduced to approximately seventy percent of its original width and thus creates a frictional force on the compressible longitudinal device. But to insure that the expanded honeycomb remains in its expanded position, a clip may be inserted over the longitudinal device just inside each end of the expanded honeycomb. To create the friction referred to above it is recommended that a hole drilled with a bit no greater than one sixty-fourth of an inch larger than the diameter of the longitudinal device be used. The preferred longitudinal device for this system is either a plastic spline, such as used in window screen repair, or a twisted paper cord or a twisted wire brush. Separate slices can be loaded onto a longitudinal device and either adhered to one another for an extended length or separated and placed at any interval.

In a somewhat different system, the longitudinal device consists of a semi rigid material such as a twisted, stranded wire. This longitudinal device is inserted through all the holes of the compressed honeycomb plies. At this point the strands of the longitudinal device are separated at both ends and bent slightly. A few of the honeycomb plies are then pulled over the ends of these strands which no longer will fit back through the holes. The honeycomb is thus maintained in its expanded condition and the semi rigid device can be bent to form the honeycomb into various shapes. The twisted wire can be removed by tearing the end plys off one end that held the honeycomb in expansion.

BRIEF DESCRIPTION OF THE DRAWINGS ON PAGES 1 TO 7 INCLUSIVE

FIG. 1 Page 1 shows an expanded section of honeycomb 10. Inserted through holes in the honeycomb plies is a longitudinal device 12 which may be a cord or a twisted wire brush similar to a pipe cleaner, a tube 14, a stranded twisted wire 15 and a tube 16 with an insert 18, which insert may be a wire or similar longitudinal device. Also shown is a groove 20 which can be used to position items to be protected.

Figure 2:
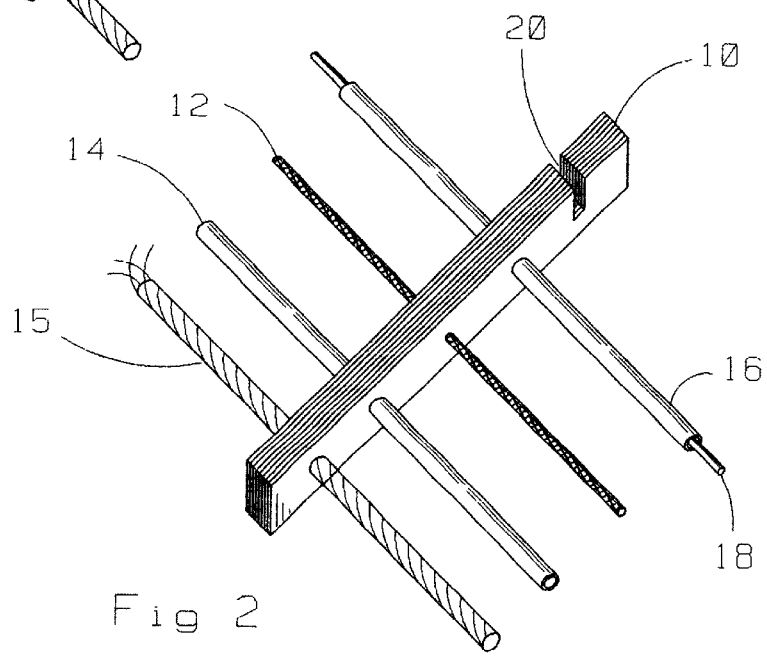

FIG. 2 Page 1 shows the compressed section of honeycomb of FIG. 1 containing the longitudinal device 12, the twisted, stranded wire 15 the tubes 14 and 16 with the insert 18 and the groove 20.

Figure 3:
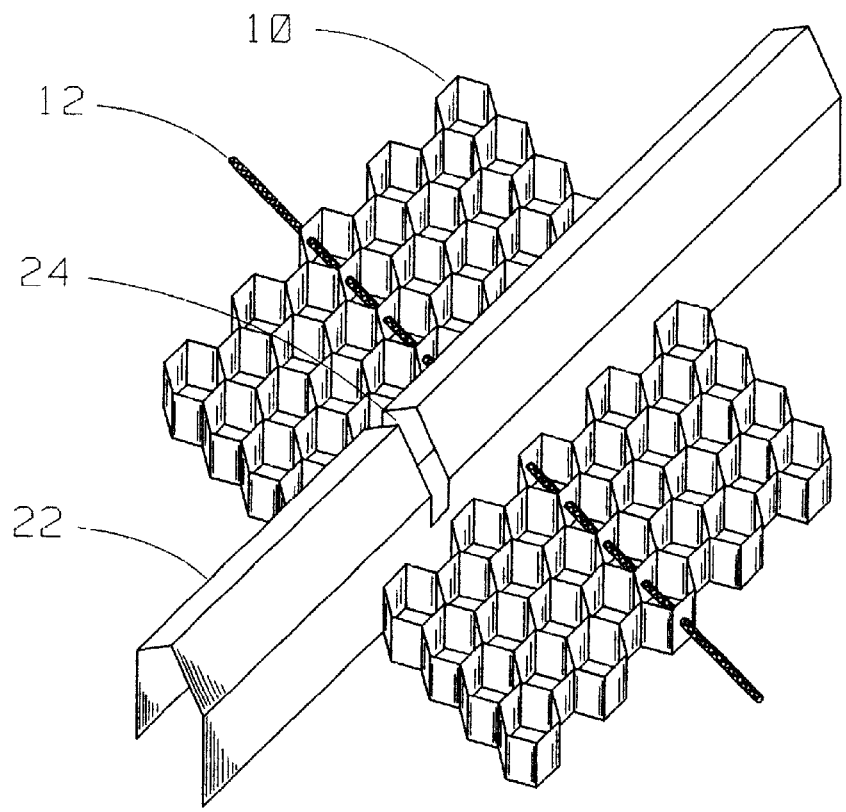

FIG. 3 Page 2 shows an expanded form of paperboard or similar material 22 containing a slot 24 which form may be adhered to sections of expanded honeycomb. Also shown is the longitudinal device 12 which controls the expanded forms.

Figure 4:
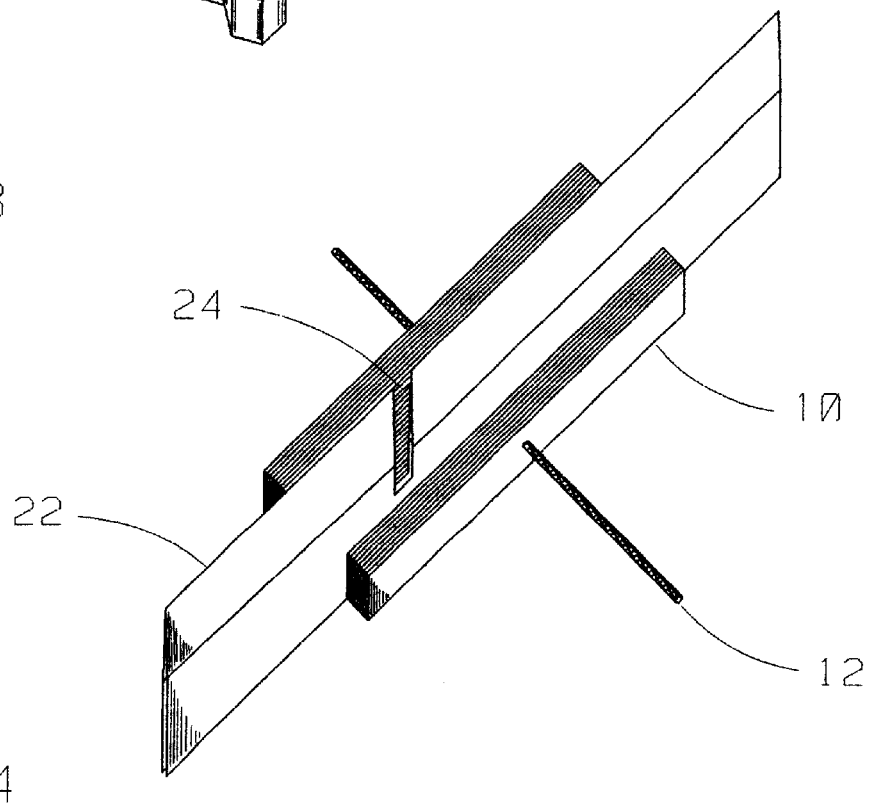

FIG. 4 Page 2 shows the compressed honeycomb 10 and paperboard from 22 with the longitudinal device 12 as shown in FIG. 3.

Figure 5:
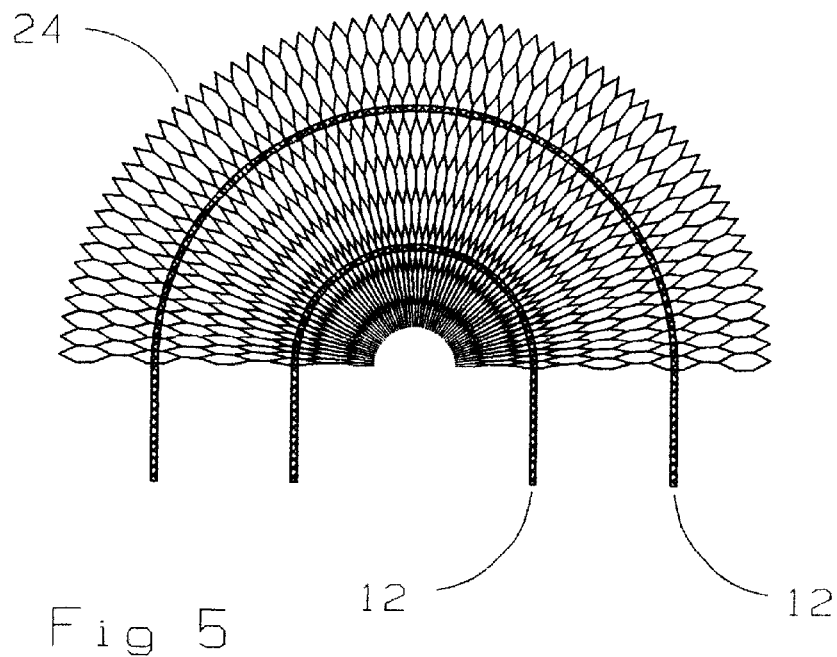

FIG. 5 Page 3 shows a section of honeycomb expanded in a semi-circular fashion 24 and containing two longitudinal devices 12 which maintain its curved shape.

Figure 6:
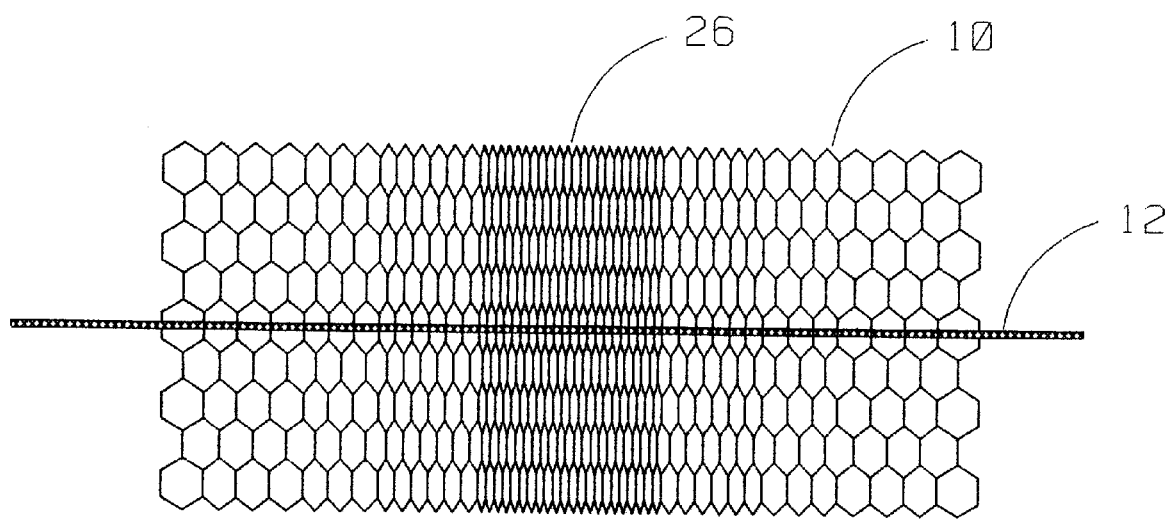

FIG. 6 Page 3 illustrates an expanded honeycomb section with a longitudinal device 12 which maintains the center area in a partial expansion 26.

Figure 7:
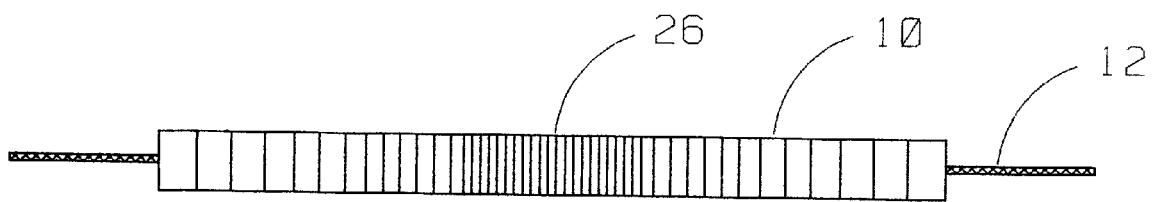

FIG. 7 Page 4 shows an edge view of FIG. 6.

Figure 8:
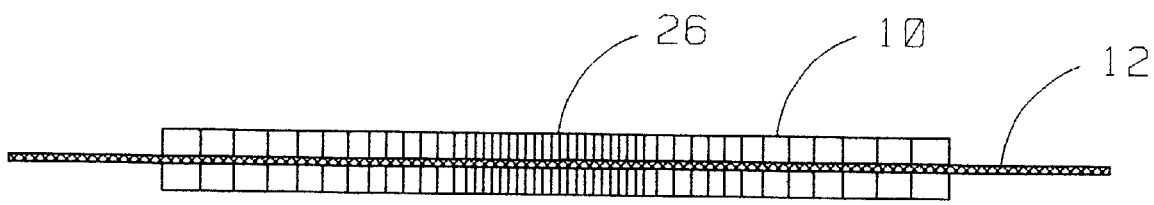

FIG. 8 Page 4 illustrates a cross section of FIG. 7 showing the longitudinal device 12.

Figure 9:
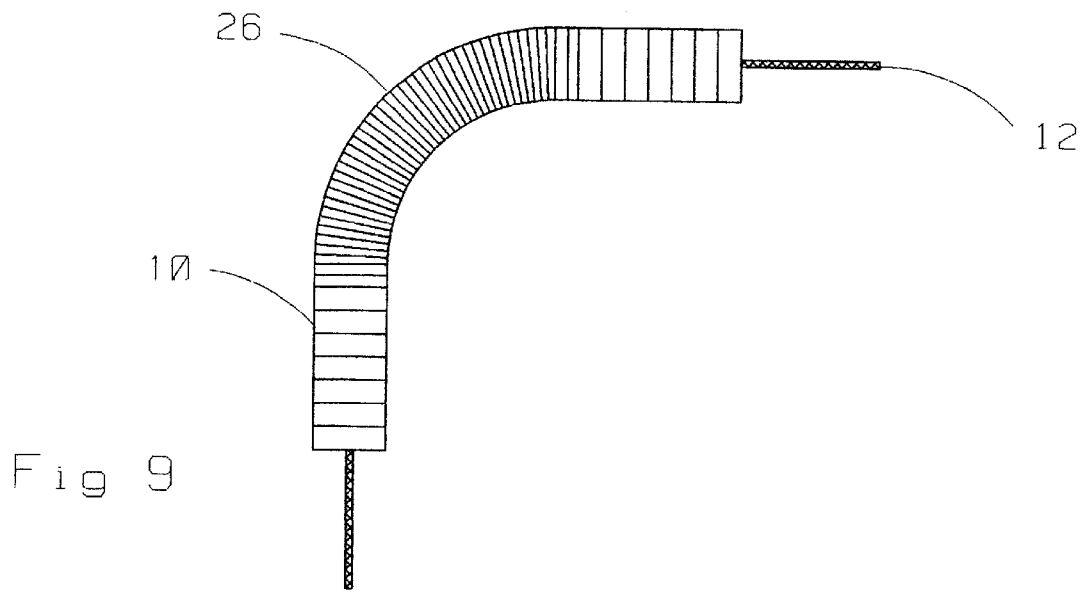

FIG. 9 Page 5 shows how the form in FIG. 7 can be bent along the under-expanded section 26 without causing excessive distortion.

Figure 10:
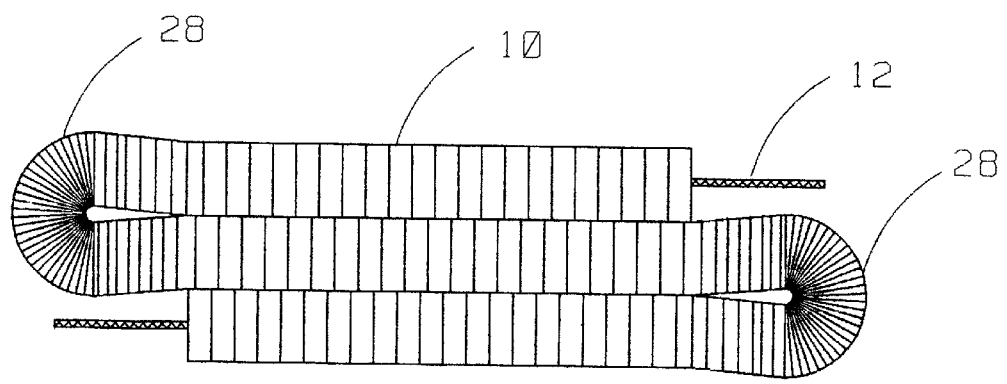

FIG. 10 Page 5 shows an edge view of expanded honeycomb 10 with 180 degree bends in the under-expanded areas which permit layering of the expanded honeycomb.

Figure 11:

FIG. 11 Page 6 shows two separate un-expanded honeycomb sections along one longitudinal device.

Figure 12:
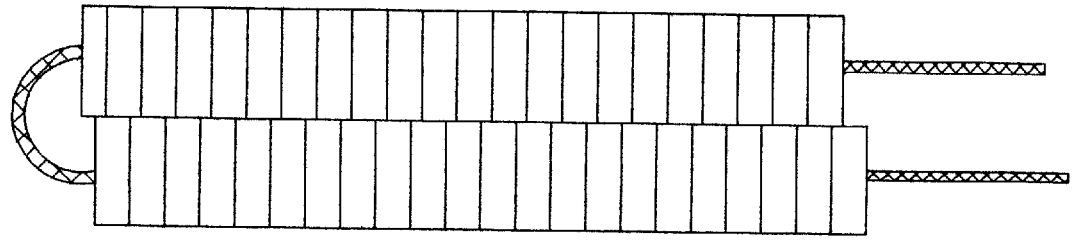

FIG. 12 Page 6 shows the honeycomb sections of FIG. 11 that have been expanded and layered upon one another to increase there thickness.

Figure 13:
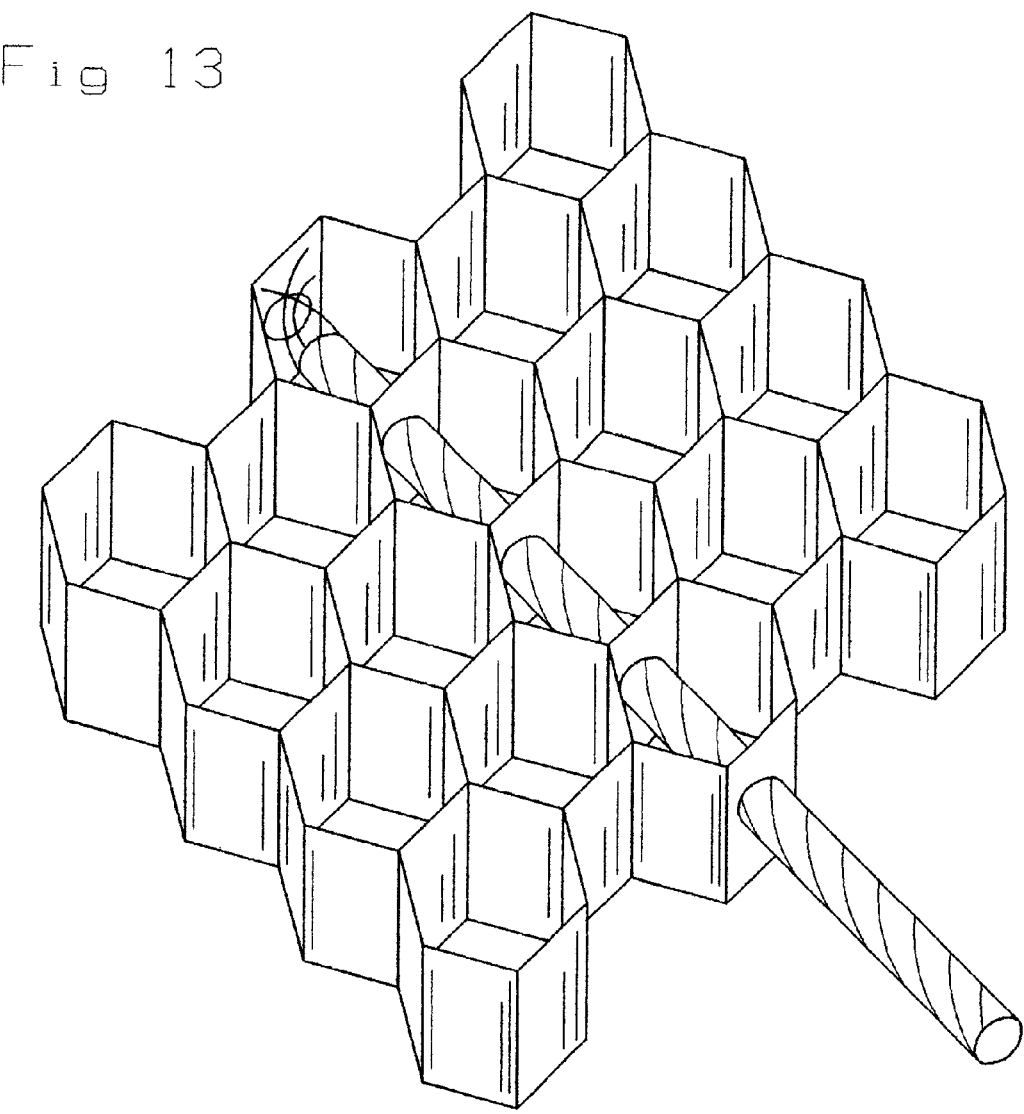

FIG. 13 Page 7 shows a honeycomb cell with an end of the twisted stranded wire, which strands have been separated and bent to prevent the wire from penetrating the holes in the end plys.

USES FOR UN-FACED EXPANDED HONEYCOMB

As a traction device for cars caught in deep snow or mud. By placing an expanded form under or next to a wheel the spinning should be overcome.

As a fire starter using a burnable longitudinal device by impregnating the plies with wax or oil.

As a space filler. It can be doubled over by folding or rolling. Bending on itself is best done along an unexpanded or partially expanded section to lessen any anticlastic action, or by placing two or more honeycomb slices on the same lengthwise device and folding over as needed.

As an edge protecting material or separator for flat glass, windows, sharp items such as knives, axes, sheet metal items, heavy fragile items such as tubs, sinks, toilets, heavy motors or castings, concrete pipe, paper rolls, storage batteries, stainless sinks and plastic sheets.

As a soil erosion control for farms, terraces, road sides, railroad beds, and when coated with seed and fertilizer, to replace or add vegetation. A lawn roller or other weighted roller can be used to press the honeycomb into the loose soil or sand.

As a core material for panels of various kinds such as office partitions where the expanded core can be positioned in place for the application of the facing sheets. Such a core can contain tubing to carry wiring or communication devices or act as a conduit for fluids.

As a decorative streamer used in any attitude, vertical or horizontal, and which can be readily compressed for easy storage after use.

To Add to Length of Honeycomb Slice

There is a practical limit to the length of an un-expanded slice. To increase the length, additional slices can be glued thereon. To make certain the added slices are aligned correctly they can be threaded on the cord or other longitudinal device much like stringing beads on a cord It is also possible to provide two holes with a cord in each to make certain of correct alignment. Thus an aligned, expandable honeycomb system can be assembled with a length limited only by the length of the cord or similar member. Such a long length can be useful in creating extra long length streamers to span streets or paring lots or other wide spaces for parades, Christmas, Fourth of July or other celebrations.

What is claimed is:

1. A method of securing individual plies of a flexible honeycomb in a fully expanded, partially expanded, or compressed state by the use of one or more transverse longitudinal members passing through an orifice or orifices in the aforementioned plies, said transverse members comprised of material that will provide sufficient resistance to slippage of said plies so that said plies are retained in place along said transverse member or members.

2. A method of maintaining honeycomb plies with holes therein in an expanded position along a longitudinal device comprising strands at its ends after loading thereon, separating the strands at the ends of the longitudinal device, pulling a few plies over these ends and allowing the springback force to seat the plies on the ends of the separated strands, preventing any further return.

3. A method as in claim 1 wherein said transverse member or members consist of a cord of twisted.

4. A method as in claim 1 wherein said transverse member or members consist of thermoplastic tubing or plastic spline.

5. A method as in claim 1 whereby said transverse member or members consist of a compressible cord or rope.

6. The transverse member or members of claim 1 that consist of a coated or covered wire.

7. The transverse member or members of claim 1 that consist of tubing, which can function as a conduit in the expanded honeycomb for purposes of threading wiring or communication means or other lineal members through said conduit or which can be used as a conductor of gases or liquids.

8. The transverse member or members of claim 1 that consist of rigid or semi-rigid material such as a twisted wire containing a bristle-like material which is easily inserted through the orifices of the plies of the compressed honeycomb and provide a braking means against the movement of said plies once expanded and further capable of being bent to form the expanded honeycomb plies into various shapes.

9. The transverse member or members of claim 1 may contain a clipping device attached to said transverse member or members applied thereto just inside ends expanded honeycomb to prevent unintended return movement of the expanded plies.

10. The longitudinal device of claim 2 may consist of semi rigid material such as a multiple strand wire, over the ends of which a few plies of the expanded honeycomb can be pulled after separating the wire strands which then serve as a bumper against returning honeycomb plies.

* * * * *